Patented July 29, 1930

1,771,976

UNITED STATES PATENT OFFICE

WALTER B. COFFEY AND JOHN D. HUMBER, OF SAN FRANCISCO, CALIFORNIA

THERAPEUTIC SUBSTANCE AND METHOD OF PREPARING THE SAME

No Drawing.    Application filed March 12, 1930.    Serial No. 435,281.

Our invention relates to a therapeutic substance having the property of stabilizing tissue growth and which by virtue of this property is capable of controlling and/or destroying carcinoma, sarcoma and other malignancies, and to a method of preparing the same.

An object of the invention is to provide such a material which when scientifically used will not produce any undesirable effects on the normal tissue of the body, or any constitutional disturbance, or any undesirable reaction at the point of injection or application.

A product of the invention comprises or consists of an active principle, perhaps an hormone, which we believe is normally supplied as a stabilizer of tissue growth in the healthy human body. Our experiments have demonstrated that a useful source of the active principle, in the bodies of animals is the cortex of suprarenal gland, and we have succeeded in preparing from the cortical portion of this gland, including the enveloping membrane, a potent extract which has the desired properties above mentioned.

The various steps by which the extract is made include in general the careful preparation of the fresh or suitably preserved animal glands; the selection of a portion of the cortical substance and its envelope; the extraction from the selected material of the active principle, by the application of heat to an aqueous mixture of the same; and the elimination of undesirable matter from the resultant extract or solution by precipitation and filtration.

In a typical extractive process embodying our invention, which for the purpose of illustration we shall give in detail, some 1500 suprarenal sheep glands are used; and it is desirable that the entire lot be used within four days from the time when the animal is killed. Methods of preserving the glands may be developed which may obviate this requirement. Glands from other animals, such as the pig, may be used, but we prefer the sheep glands because of their general availability, greater ease in preparation and superiority in results obtained. Until the glands are used, they are kept in a cool, ventilated container, the temperature of which should be maintained between 5 and 15° C. (41 and 59° F.). Each gland is preferably freed of all fat or adhering tissue, leaving only the gland and its membrane covering. These are then placed in a normal saline solution, as the phrase is understood by physicians, at a temperature of about 15° C. (59° F.) for a period of three to four minutes so as to facilitate the treatment to follow.

The glands are next cut from pole to pole, leaving the envelope on the shorter side intact. Since only the cortical substance and the envelope are used in our process, the medullary portion is then carefully dissected away under a large magnifying glass; and because the medullary portion of the gland must be excluded, we include in the part removed a portion, say about the inner one-third, of the cortex, so that only approximately the outer two-thirds of the cortex, together with the envelope, remain. As the parts of the glands are prepared they are preferably placed in a jar and kept at a temperature of about 10° C. (50° F.). The work should proceed rapidly to avoid putrifactive changes. Probably the material should not be kept over twelve hours at this stage.

After the total quantity of glandular material has been thus prepared, its volume is noted, and the material is finely macerated. Pure water such as triple distilled water is then added in the proportion of two and one-half parts of water by volume to each part by volume of the gland material before maceration; and the mixture is allowed to stand for about ten minutes, so that a thorough saturation of the macerated material with the water occurs. The mixture is next put in a suitable container such as a glass flask and subjected to heat preferably in a water bath. We regard the subsequent heat treatment as highly important, and while special circumstances may prompt variations in temperature, without destroying the effectiveness of the final result, our researches prompt us to believe that the temperatures indicated are the most satisfactory.

In the water bath, the temperature of the mixture is raised to about 60° C. (140° F.)

and from this temperature it is gradually increased through a period of about three-quarters of an hour to about 70° C. (158° F.). The treatment is continued at the latter temperature for from sixteen to twenty hours when the temperature of the mixture is raised to about 85° C. (185° F.) and continued thus for about one and one-half hours. We find this gradual increase in temperature in the manner explained, produces a more potent extract than the sudden application of a single temperature would accomplish.

The temperature of the mixture is next reduced to 65° C. (149° F.), and maintained at this temperature for a period of twenty to twenty-four hours. At any time during this 65° C. period, or even during the previous period after the solution has been heated to 85° C., but preferably at the beginning of the 65° C. period, we add, say ten minims of dilute (10%) hydrochloric acid to each 1000 cubic centimeters of mixture. By adding the acid at the beginning of the 65° C. period, thorough intermingling is assured. The purpose of the acid is to facilitate filtering, and only sufficient should be used to produce a very faintly acid reaction upon testing with litmus. The proportion stated will usually accomplish this result. Other acids such as dilute acetic acid may be used.

The mixture is now removed from the water bath, allowed to cool to a temperature of about 55° C. (131° F.), strained through 3-ply gauze, and the residue pressed until substantially all the liquid is recovered. The solid matter is discarded, and the resulting liquid is passed directly from the straining operation through filter paper into a known preservative quantity of pure 190-proof ethyl alcohol. The volume of the alcohol content of the filtrate-alcohol mixture is then increased by the addition of alcohol to a quantity sufficient to produce precipitation of colloidal, suspended and/or dissolved matter, e. g., to two and one-half times or more the volume of the filtrate.

Any other suitable means of preserving or protecting the filtrate during the straining and filtering operation may be employed.

The mixture is then allowed to stand for about twenty-four hours, while maintained at a temperature of about 15.5° C. (60° F.) to permit clouding and settling. At this point the liquid is decanted or siphoned off, and filtered preferably through fine white filter paper, the temperature being then dropped to about 12.8° C. (55° F.), at which temperature it is allowed to stand for about thirty-six hours to permit further clouding and settling; when it is again decanted and filtered preferably through fine white filter paper, and permitted to stand for another twelve hours at the same temperature.

After another filtering, preferably through fine white filter paper, we distill off all the alcohol, so as to leave an alcohol-free aqueous solution. The solution is then again chilled, preferably to 15.5° C. (60° F.), allowed to stand for twelve hours and again decanted and filtered preferably through fine white filter paper. The resulting filtrate is next passed into sterile flasks through a porcelain or ceramic filter, such as the Berkefeld, so that any remaining undesirable extraneous matter including bacteria, germs, spores or other bodies which are not removed by the previous filtrations are removed. Any good bacteriological filter whether porcelain or not, may be used. Of course, the utmost care must be taken to prevent contamination.

After the cooling and filtering into alcohol, as described above, the subsequent steps may proceed at a temperature of about 15.5° C. (60° F.) throughout the remainder of the process; and very good results will be obtained if this is done without variation of more than 3° C. (5.4° F) above or below that temperature. Actual tests, however, prompt us to believe that the most potent extract results from the steps and temperatures hereinbefore specified.

In order to preserve the extract at ordinary temperatures, a suitable amount of a preservative, for example at least 0.1% and not more than 0.2%, of tricresol preferably is added. Other preservatives such as thymol may be used, but they should not be destructive to the active principle of the extract, or irritating or injurious to the tissues at the point of injection. This mixture is then allowed to stand undisturbed for thirty-six hours, at which time it is carefully examined for cloudiness. If any cloudiness is apparent the solution is again filtered preferably through fine white filter paper and again passed through a porcelain or equivalent filter. When a solution is secured which is perfectly clear at the end of thirty-six hours, test cultures are made and incubated for twenty-four hours, and if no evidence of growth is found at the end of that time, the solution is bottled in suitable sterile containers. The material so prepared has been found to be quite stable under storage at room temperatures. Samples of the extract have been kept in storage in stoppered glass bottles for more than one year without apparent deterioration or loss of potency.

The injections of our extract may be given in any subcutaneous tissue, for convenience preferably in the arm and remote from the location of the malignancy or involved area. The dosage is determined by the circumstances of the individual case and we have successfully administered graduated dosages from 1 minium to 1 cc.

When our extract is injected into the body of a patient having carcinoma, sarcoma and/or other malignancies, it is absorbed into the circulation. No local reaction or general constitutional disturbance occurs, when the extract is scientifically administered, but usually within twenty-four to forty-eight hours after the first injection, the tissues of the diseased area show evidence of its action. The extract has been found to be capable of destroying carcinoma, sarcoma and other malignancies without destruction of or injury to the normal body cells or tissues.

The diseased condition may be anywhere in the body, e. g., deeply buried within the viscera or heart or lung, or in the glands or other vital organs; but irrespective of its location, necrosis commences soon after injection of the extract. The diseased tissues are destroyed and turned into a soft dead cell mass, which sloughs off when anatomically possible and is gradually disposed of by the system in the usual way or when sloughing is not anatomically possible, removal of the dead tissue from the body may be assisted by surgical means.

Within a few hours of the first injection, in a majority of the cases the pain incident to the disease has been found to be greatly relieved or completely stopped, and other favorable physiological reactions occur in most instances, such as the reducing of abnormally high blood pressure.

Our researches have suggested that a systemic disease is one caused by a disturbance of the balance of the physical system caused or accompanied by the absence or deficiency of some element which normally serves to stabilize tissue growth. Under such circumstances some of the body cells may begin to grow with anarchic disregard for the rest of the body cells; and they may grow so prolifically as to overcome the normal tissues. Carcinoma and sarcoma are examples of such anarchic growth in which the epithelial and similar cells grow in seemingly irresponsible manner. It follows that if malignancies including cancer, are the result of loss or weakening or deficiency of the stabilizing principle or hormone, the artificial supplying of this principle or hormone should restore the balance and stabilize the growth of the cells.

It is to be understood that we do not claim to have established this theory as a fixed law, but our investigations lead us to believe that it is true, and as an hypothesis it seems to account for the results of our experiments and the favorable effects following the injection.

It is possible that the active principle responsible for the results mentioned may be obtained elsewhere and by other specific methods, or even synthetically, but so far as we now know the cortical portion of the suprarenal gland is the only one in which the active principle occurs in sufficient concentration to be therapeutically efficacious for the purpose intended.

Wherever in the specification and claims, "cortex" or "cortical substance" appears, it is to be understood that we mean the outer or cortical layer of the gland, either with or without the enveloping membrane, but excluding the medullary portions.

We claim:

1. In a process of preparing an extract of the isolated cortical substance of suprarenal glands for causing sloughing or necrosis of carcinoma, sarcoma and other malignant tissue the step which consists in digesting said substance in water at a temperature of from 60° C. to 85° C. to secure an aqueous extract containing an active principle thereof.

2. In a process of preparing an extract of the isolated cortical substance of suprarenal glands for causing sloughing or necrosis of carcinoma, sarcoma and other malignant tissue the step which consists in digesting said substance in water in stages at progressively increasing temperatures from about 60° C. to not substantially exceeding 85° C. to secure an aqueous extract containing an active principle thereof.

3. In a process of preparing an extract of the isolated cortical substance of suprarenal glands for causing sloughing or necrosis of carcinoma, sarcoma and other malignant tissue the steps which consist in digesting said substance in water at a temperature of from 60° to 85° C. to secure an aqueous extract containing an active principle thereof, cooling said extract, adding ethyl alcohol to the cooled extract, and removing unfilterable material and alcohol from the mixture.

4. In a process of preparing an extract of the isolated cortical substance of suprarenal glands for causing sloughing or necrosis of carcinoma, sarcoma and other malignant tissue the steps which consist in digesting said substance in water at a temperature of from 60° to 85° C. to secure an aqueous extract containing an active principle thereof, cooling the extract while filtering it into ethyl alcohol, freeing the resulting mixture of unfilterable matter while maintaining it at a temperature between 10° C. and 18° C., and removing the alcohol from the liquid.

5. Process of making a glandular product which comprises extracting the isolated cortical portion of suprarenal glands with water at a progressively increasing temperature not exceeding about 85° C., adding ethyl alcohol to the resulting aqueous extract, allowing the mixture to stand at a temperature in the neighborhood of 15° C., and separating unfilterable matter therefrom, removing the alcohol, and permitting the resulting aqueous liquid to stand at a temperature in the neighborhood of 12° C. and filtering any unfilterable material therein until a permanently clear solution is obtained.

6. Process of making a glandular extract which comprises treating the isolated cortical substance of the suprarenal gland with water starting at a temperature of about 60° C., progressively increasing the temperature to about 70° C. and maintaining the latter temperature for about 18 hours, raising the temperature to about 85° C. for about 1½ hours, reducing the temperature to about 65° C. and maintaining this temperature for about 20 to 24 hours, cooling to about 55° C. and filtering into a preservative quantity of alcohol, adjusting the alcohol content of the resultant mixture to about 2½ parts of alcohol for each part of filtrate, allowing the filtrate-alcohol mixture to stand for about 24 hours at about 15.5° C. to permit clouding and settling, filtering the mixture and allowing the resulting filtrate to stand for about 36 hours at about 12.8° C. to permit further clouding and settling, filtering the mixture and allowing it to stand at about 12.8° C. for about 12 hours, and again filtering, removing the alcohol content of the mixture by distillation at a temperature below 100° C., cooling the alcohol free residue to about 15.5° C. and thereafter allowing the mixture to stand with occasional filtering at this temperature through a bacteriological filter until the solution remains quite clear after standing for 36 hours.

7. A potent water extract of the isolated cortical portion of suprarenal glands, being a clear liquid, stable under storage at room temperatures, non-toxic and non-irritating when injected subcutaneously and which when injected subcutaneously at a point removed from the involved tissue causes sloughing or necrosis of carcinoma, sarcoma and other malignant tissue, obtainable by extracting the isolated cortical portion of suprarenal glands with water at a temperature of about from 60° C. to 85° C., mixing the resulting aqueous extract with ethyl alcohol, separating unfilterable matter from the mixture, removing the alcohol at a temperature not exceeding 100° C., and thereafter removing any unfilterable material from the extract appearing therein after long standing at or below room temperatures.

8. A potent water extract of the isolated cortical portion of suprarenal glands, being a clear liquid, stable under storage at room temperatures, non-toxic and non-irritating when injected subcutaneously and which when injected subcutaneously at a point removed from the involved tissue causes sloughing or necrosis of carcinoma, sarcoma and other malignant tissue, prepared by treating the isolated cortical substance of the suprarenal gland with water starting at a temperature of about 60° C., progressively increasing the temperature to about 70° C. and maintaining the latter temperature for about 18 hours, raising the temperature to about 85° C. for about 1½ hours, reducing the temperature to about 65° C. and maintaining this temperature for about 20 to 24 hours, cooling to about 55° C. and filtering into a preservative quantity of alcohol, adjusting the alcohol content of the resulting mixture to about 2½ parts of alcohol for each part of filtrate, allowing the filtrate-alcohol mixture to stand for about 24 hours at about 15.5° C. to permit clouding and settling, filtering the mixture and allowing the resulting filtrate to stand for about 36 hours at about 12.8° C. to permit further clouding and settling, filtering the mixture and allowing it to stand at about 12.8° C. for about 12 hours, and again filtering, removing the alcohol content of the mixture by distillation at a temperature below 100° C., cooling the alcohol free residue to about 15.5° C. and thereafter allowing the mixture to stand with occasional filtering at this temperature through a bacteriological filter until the solution remains quite clear after standing for 36 hours.

9. A potent water extract of the isolated cortical portion of suprarenal glands, being a clear liquid, stable under storage at room temperatures, non-toxic and non-irritating when injected subcutaneously, and which when injected subcutaneously into humans afflicted with carcinoma, sarcoma or other malignancy, at a point removed from the involved tissue, in the majority of cases reduces abnormally high blood pressure, relieves pain and causes sloughing or necrosis of the malignant tissue.

In testimony whereof, we affix our signatures.

WALTER B. COFFEY.
JOHN D. HUMBER.